(12) United States Patent
Gray et al.

(10) Patent No.: US 11,735,789 B2
(45) Date of Patent: Aug. 22, 2023

(54) DEVICE FOR MANAGING THE STATE OF HEALTH OF AN ELECTROLYTE IN A REDOX FLOW BATTERY SYSTEM

(71) Applicant: UOP LLC, Des Plaines, IL (US)

(72) Inventors: David E. Gray, Homer Glen, IL (US); William T. Kender, Chicago, IL (US); Stuart R. Miller, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/559,837

(22) Filed: Dec. 22, 2021

(65) Prior Publication Data

US 2023/0198053 A1 Jun. 22, 2023

(51) Int. Cl.
*H01M 16/00* (2006.01)
*H01M 8/18* (2006.01)
(Continued)

(52) U.S. Cl.
CPC ..... *H01M 16/006* (2013.01); *H01M 8/04283* (2013.01); *H01M 8/04313* (2013.01); *H01M 8/04746* (2013.01); *H01M 8/188* (2013.01)

(58) Field of Classification Search
CPC .. H01M 16/00; H01M 16/003; H01M 16/006; H01M 8/04283; H01M 8/04313;
(Continued)

(56) References Cited

U.S. PATENT DOCUMENTS 4,159,366 A * 6/1979 Thaller ................. H01M 8/188
429/444

10,347,925 B2  7/2019 Pijpers
(Continued)

FOREIGN PATENT DOCUMENTS

| KR | 20140123337 A | 10/2014 |
| KR | 20210035899 A | 4/2021 |
| WO | 2020033766 A1 | 2/2020 |

OTHER PUBLICATIONS

Noah, Karl S. et al., Hydrogen Reduction of Ferric Ions for Use in Copper Electrowinning, Idaho National Engineering and Environmental Laboratory, Bechtel, BWXT Idaho, LLC, Jan. 2005.
Hruska, L.W., et al., Investigation of Factors Affecting Performance of the Iron-Redox Battery, J. Electrochem. Soc.: Electrochemical Science and Technology, vol. 128, No. 1, Jan. 1981.
(Continued)

*Primary Examiner* — Matthew W Van Oudenaren

(57) ABSTRACT

Devices and methods for managing the state of health of an electrolyte in redox flow batteries (RFB) efficiently are described. A diffusion cell is added to the RFB which controls one or more properties of the electrolytes using the diffusion of protons through a proton exchange membrane. The diffusion cell can resemble an electrochemical cell in that there are two fluid chambers divided by a proton conducting membrane. Anolyte flows through one side of the device where it contacts the proton conducting membrane, and catholyte flows through the second side of the device where it contacts the other face of the proton conducting membrane. The concentration gradient of protons from high concentration in the catholyte to low concentration in the anolyte is the driving force for proton diffusion, rather than electromotive force, which greatly simplifies the design and operation.

20 Claims, 1 Drawing Sheet

(51) Int. Cl.
    *H01M 8/04313*    (2016.01)
    *H01M 8/04746*    (2016.01)
    *H01M 8/04276*    (2016.01)

(58) Field of Classification Search
    CPC .... H01M 8/04746; H01M 8/188; H01M 8/18; H01M 8/184; H01M 8/04186; H01M 8/04194; H01M 8/04402; H01M 8/04388; H01M 8/04477; H01M 8/04671; H01M 8/04679; H01M 8/04753; H01M 8/04761; H01M 8/04791; H01M 8/04798; H01M 8/04805; H01M 8/04858; H01M 8/04865; H01M 8/04895; H01M 8/04925; H01M 8/04537; H01M 8/04544; H01M 8/04574; H01M 8/04604; H01M 8/04664; H01M 2300/0002; H01M 2300/0005
    See application file for complete search history.

(56) References Cited

U.S. PATENT DOCUMENTS

| | | |
|---|---|---|
| 2015/0155586 A1 | 6/2015 | Pham et al. |
| 2016/0308235 A1* | 10/2016 | Reece .................... H01M 8/20 |
| 2021/0226239 A1 | 7/2021 | Underwood et al. |

OTHER PUBLICATIONS

International Search Report from corresponding PCT application No. PCT/US2022/081809, dated Apr. 17, 2023.

Written Opinion from corresponding PCT application No. PCT/US2022/081809, completed Apr. 17, 2023.

Jens Noack et al., Studies on Fe/Fe Redox Flow Batteries with Recombination Cell, Journal of the Electrochemical Society, 2020, 167, 160527.

* cited by examiner

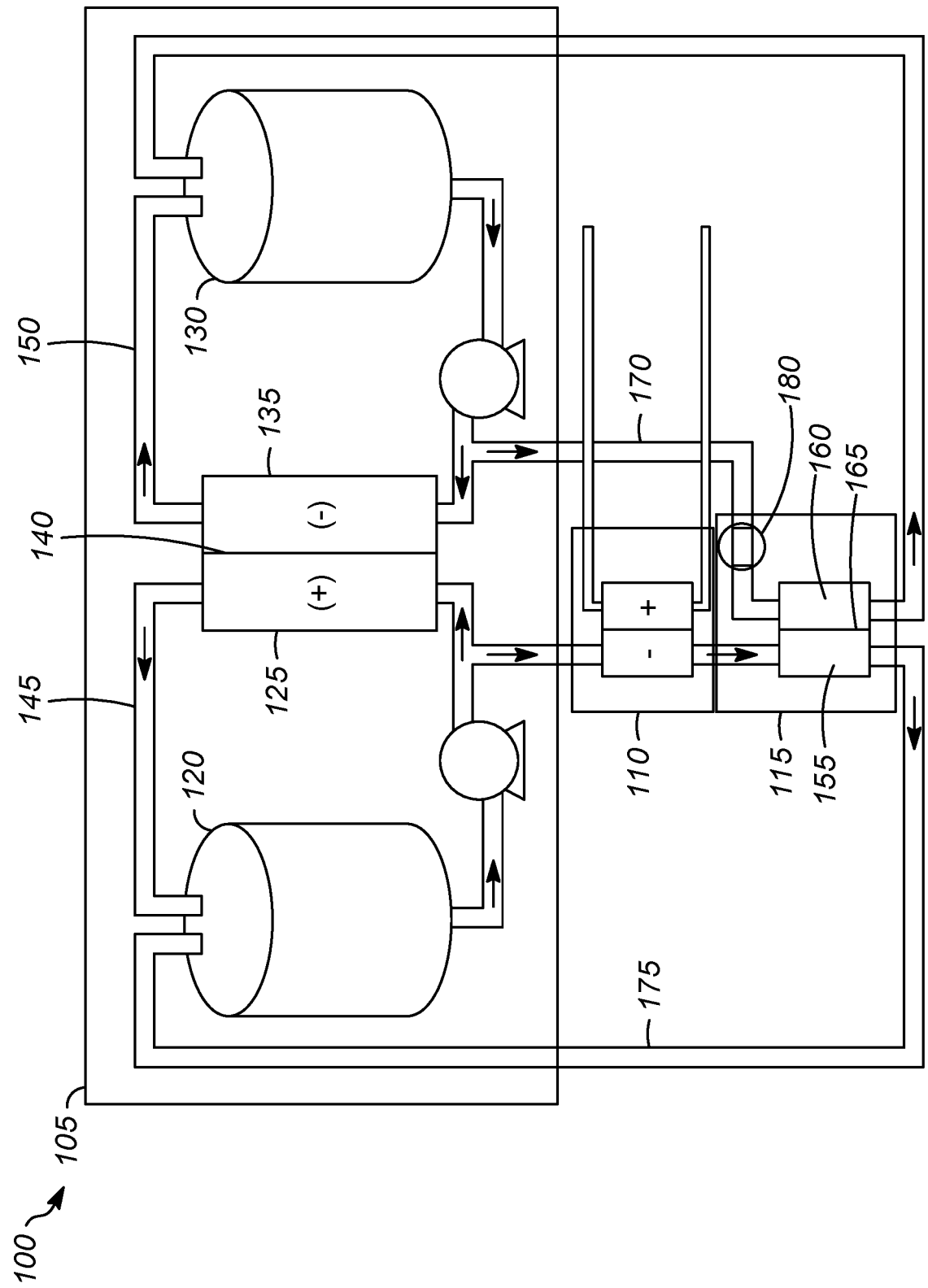

DEVICE FOR MANAGING THE STATE OF HEALTH OF AN ELECTROLYTE IN A REDOX FLOW BATTERY SYSTEM

BACKGROUND OF THE INVENTION

Energy storage systems have played a key role in harvesting energy from various sources. The energy storage systems can be used to store energy and convert it for use in many different applications, such as building, transportation, utility, and industry. A variety of energy storage systems have been used commercially, and new systems are currently being developed. Energy storage types can be categorized as electrochemical and battery, thermal, thermochemical, flywheel, compressed air, pumped hydropower, magnetic, biological, chemical and hydrogen energy storages. The development of cost-effective and eco-friendly energy storage systems is needed to solve the energy crisis and to overcome the mismatch between generation and end use.

Renewable energy sources, such as wind and solar power, have transient characteristics because they depend on environmental conditions and therefore require associated energy storage. Battery Energy Storage Systems (BESSs) such as redox flow batteries (RFBs) have attracted significant attention for large-scale stationary applications such as grid scale electricity storage. RFBs are electrochemical energy storage systems that reversibly convert chemical energy directly to electricity and are typically composed of two external storage tanks filled with active materials comprising metal ions that may be in different valance states, two circulation pumps, and a flow cell with a separation membrane which is located between the anode and the cathode and is used to separate the anolyte and the catholyte, as well as to utilize the current circuit by allowing the transfer of balancing ions. The anolyte, catholyte, anode, and cathode are commonly referred to as the negative electrolyte, positive electrolyte, negative electrode and positive electrode, respectively.

Among all the redox flow batteries developed to date, the all-vanadium redox flow batteries (VRFB) have been the most extensively studied. VRFBs use the same active species (vanadium) in both half cells, as such preventing contamination of electrolytes from one half cell to the other half cell through crossover at the membrane. VRFBs, however, are inherently expensive due to the use of high-cost vanadium.

In the early 1980s, Hruska et al. demonstrated the ability to cycle an all-iron redox flow battery (IFB) citing them to be attractive battery energy storage devices for large scale energy storage applications such as load leveling and solar storage owing to the use of low cost and abundantly available iron, salt, and water as the electrolyte and the chemically safe nature of the system. (Investigation of Factors Affecting Performance of the Iron-Redox Battery, J. Electrochem. Soc., Vol. 28, No. 1, p. 18-25, January, 1981). Similar to VRFBs, IFBs leverage the same active species (Fe) in different valance states in both the positive and negative electrolytes for the positive and negative electrodes, respectively. The iron-based electrolyte solutions are stored in external storage tanks and flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge; the reaction is given by Equation 1. The anode side half-cell reaction involves the deposition and dissolution of iron in the form of a solid plate; the reaction is given by Equation 2. The overall reaction is shown in Equation 3.

$$\text{Redox electrode: } 2Fe^{2+} \leftrightarrow Fe^{3+} + 2e^- + 0.77V \quad (1)$$

$$\text{Plating electrode: } Fe^{2+} + 2e^- \leftrightarrow Fe^0 - 0.44V \quad (2)$$

$$\text{Total: } 3Fe^{2+} \leftrightarrow Fe^0 + 2Fe^{3+} 1.21V \quad (3)$$

All-iron RFB typically operate with acidic electrolytes and are known to have parasitic H2 evolution at the anode. This reaction removes protons from the negative electrolyte to form hydrogen gas, which has the net effect of creating an imbalance in the state of charge of the battery and leads to a continual increase in the pH of the electrolyte system. Eventually, if there is no correction, either the imbalance in the state of charge of the battery or the increasing pH of the electrolyte will lead to cell failure.

During the normal operation of an RFB, small inefficiencies can create large problems over the lifetime of the battery. These problems can stem from several sources such as: cross-over of active species across the membrane, parasitic side reactions, or incomplete discharging of the battery. Even small inefficiencies can eventually result in a poorly performing battery in a product designed to last more than 20,000 cycles. Therefore, a process is needed which can correct these inefficiencies. One solution to these problems is mixing the electrolytes together to rebalance and refresh the system. Typically, this may involve completely mixing the electrolyte solutions (anolyte and catholyte). The electrolytes are then appropriately re-apportioned to the initial volumes. This process often rectifies several issues in RFBs, including a volume differential driven by osmotic pressure, redistribution of active species and supporting electrolyte, and the modulation of pH on both sides. Once the anolyte and catholyte are mixed together, the resulting solution contains an average of the concentration of the components in the original anolyte and catholyte solutions.

Maintaining optimal operating conditions within a redox flow battery often requires engineering controls to manage the health of the battery and the relative health of the electrolyte. In all-iron redox flow batteries, system inefficiencies associated with battery cycling can result in the accumulation of ferric cations in the catholyte, which if left unmanaged can lead to reduced battery capacity.

The parasitic evolution of H2(g) has been a technical challenge associated with redox flow battery technologies for over 40 years. In 1979, Thaller reported the importance of a rebalance cell in iron-chromium RFBs to address the minor reaction (hydrogen evolution) at the chromium electrode. (U.S. Pat. No. 4,159,366). H2 generated within all the cells was collected and directed to the hydrogen (anode) electrode of the rebalance cell, and the cathode of the rebalance cell receives the Fe2+/Fe3+ flow from the rest of the system. The electrochemical reactions which occur in the rebalance cell are opposite to the undesirable reactions which occur in the redox cell and self-regulating (limited by the total H2 availability). The open circuit voltage of a H2/Fe3+ rebalance cell is about 0.7V so energy is produced rather than consumed in the rebalance process, demonstrating the electrochemical recombination of H2. In 2005, Noah et al. reported the use of the same rebalancing principle to improve the efficiency of the conventional copper electrowinning process which uses the water hydrolysis reaction as the anodic source of electrons. (Hydrogen Reduction of Ferric Ions for Use in Copper Electrowinning, Idaho National Engineering and Environmental Laboratory, INEEL/EXT-05-02602, January 2005). In order to improve energy efficiency, an alternative anodic reaction of ferrous ion oxidation was proposed, and H2 was used as an effective reductant of the ferric cation. Unlike the work of Thaller, where the ferric cations in the electrolyte and H2 gas were passed next each other separated by a membrane in an electrochemical cell, Noah et al leveraged a trickle bed column reactor, demonstrating the catalytic reduction of ferric cations, and circulating a ferric ion electrolyte by pumping electrolyte solution to the top of the reactor from a reservoir. The electrolyte drained by gravity through the bed and into the reservoir directly below the reactor. H2 was introduced to the bed through a small tube at the bottom and flowed upward through the bed and vented through an exit tube.

Current processes and systems employed for rebalancing the all-iron RFB cells are concerned with the reduction of Fe3+ to Fe2+ to control the state of charge of the catholyte. Different engineering approaches (electrochemical or catalytic) have demonstrated electrolyte rebalance within all-iron redox flow batteries, however the basic principle of ferric ion reduction remains largely unchanged from that taught by Thaller and Noah, where H2(g) is oxidized to yield protons (2H+) and electrons (2e−) which enables the catalytic reduction of Fe3+ in the catholyte to Fe2+. The reduction of Fe3+ to Fe2+ enables modification of the state of charge of the catholyte; however, the protons (H+) migrate into the positive electrolyte. This process results in the removal of protons (H+) from the negative electrolyte (during hydrogen evolution and releases them into the positive electrolyte (during rebalancing). A consequence of proton removal from the anolyte (H2 evolution) and insertion into the catholyte (H2 recombination) is the divergence of electrolyte pH from optimal operating values (the catholyte becomes more acidic and the anolyte becomes less acidic). Increasing pH of the anolyte can lead to the inability to completely oxidize plated iron to ferrous cations or the oxidation or loss of Fe0 from the cell either as an iron oxyhydroxide, iron oxide, or as iron flakes. This may result in reduced capacity in the anolyte. The direct introduction of Fe3+ cations to the higher pH anolyte can lead to the precipitation of iron oxyhydroxide or iron oxide byproducts which can lead to obstruction of electrolyte flow and battery failure.

[H+] management and electrolyte health can be controlled to some extent through cycling the battery, whereupon [H+] can cross the membrane upon cycling of the battery. Another solution is employing a passive diffusion cell with a selective proton exchange membrane, where the electrolytes are passed adjacent to each other, and protons diffuse from the catholyte to the anolyte across the PEM.

Another failure mechanism experienced by RFBs is electrolyte crossover (either hydraulic crossover, the crossover of active species, or a combination of both) across the membrane which can be driven by the variation of concentration during charge and discharge, electrolyte flow rate, pressure and osmotic pressure differences. Electrolyte properties, such as density, viscosity, and conductivity change with the oxidation state of the active species. In the case of a hybrid RFB, such as an all-iron RFB, significant disparity in the concentration of iron ions in the electrolytes can lead to a severe difference in osmotic pressure in the catholyte and anolyte, which in turn can lead to the migration of electrolyte across the membrane.

There are strategies to reduce electrolyte crossover, such as using different and varying flow rates or back pressures for each electrolytes to compensate for any pressure differential across the membrane, or by enhancing the selectivity of the separator to eliminate the crossover of active species, something which is very challenging to achieve in practice. In the case of an all-iron RFB where the active species is the same in both electrolytes, the maximum system capacity can be restored by mixing and rebalancing the electrolyte so that each electrolyte tank has an equal number of active molecules.

IFBs operating with acidic electrolytes are known to have parasitic hydrogen evolution at the anode. This becomes a problem because the electrolytes eventually end up with an unbalanced state of charge (SoC) due to electrons being consumed at the anode by hydrogen evolution instead of Fe2+ reducing to Fe0. Additionally, protons are removed from the anolyte, significantly raising the pH, which can lead to the precipitation of iron hydroxides. Ideally, charge balance in the electrolytes and pH would return to the original starting values at the end of every cycle assuming a symmetric charge and discharge protocol, with all REDOX activity only occurring at the active species. However, as described previously, parasitic side reactions can occur, e.g., H2 evolution or the precipitation of unwanted iron oxyhydroxide species, which can result in an imbalance in electrolyte properties including [Fe] in solution; [H+] and electrolyte volume. This imbalance effects the electrolyte State of Health (SoH).

Solutions to the imbalances in the SoH of the electrolyte include periodic acid addition and chemical or electrochemical H2 recombination (H2R). Periodic acid addition is undesirable due to the need for large amounts of acid to be added to the electrolyte, increasing operating costs and introducing the challenge of maintaining active species concentration. Chemical or electrochemical H2R as the sole means of controlling anolyte SoH is also challenging due to traditional H2R schemes adding protons to the catholyte instead of the anolyte. U.S. Pat. No. 10,347,925 described a 3-chamber electrochemical H2R that can add electrons to the catholyte and protons to the anolyte. However, this device requires multiple proton or anion conducting membranes and conductive end plate materials such as graphite, significantly increasing cost.

Therefore, there is a need for a simple, inexpensive method for controlling all aspects of the electrolyte SoH for iron redox flow batteries.

BRIEF DESCRIPTION OF THE DRAWINGS

FIG. 1 is an illustration of one embodiment of the invention including an IFB, an H2R, and a diffusion cell.

DESCRIPTION OF THE INVENTION

The present invention meets this need by providing inexpensive method for managing the state of health of an electrolyte which is desirable to operate a RFB efficiently. It controls the pH of the electrolytes using the diffusion of protons through a proton exchange membrane. The diffusion cell can resemble an electrochemical cell in that there are two fluid chambers divided by a proton conducting membrane. Anolyte flows through one side of the device where it contacts the proton conducting membrane, and catholyte flows through the second side of the device where it contacts the other face of the proton conducting membrane. The concentration gradient of protons from high concentration in the catholyte to low concentration in the anolyte is the driving force for proton diffusion, rather than electromotive force, which greatly simplifies the design and operation. Using the diffusion cell to control the pH of the anolyte can solve problems associated excessively high pH, such as iron hydroxide precipitation and slow reaction kinetics.

The diffusion cell is unique because it allows independent control of electrolyte SoC and pH. This allows for greater control over the operation of the RFB because the H2R can be used to exactly balance the SoC of the electrolytes, and the diffusion cell can be used to control the pH of the anolyte within a specified range. In addition, the diffusion cell is not electrochemical in nature, and so does not require bipolar plates, electrodes, etc., and therefore can be manufactured and operated at significantly lower cost.

The maximum technical benefit is realized when operating an RFB with both an H2R for SoC control and a diffusion cell for pH control. Additional benefit can be gained from placing the diffusion cell downstream of the H2R, feeding catholyte from the outlet of the H2R to the inlet of the diffusion cell. This would ensure the largest proton concentration gradient across the proton conducting membrane, and therefore the highest proton transfer rate.

This invention can provide the benefits of using an expensive membrane without the associated cost, as the size of the PEM can be scaled down (e.g., a 5:1 ratio), the total surface area of the diffusion cell can be small while still providing a large benefit to pH control.

The diffusion cell can be easily implemented by building an electrochemical cell with a proton conducting membrane separating two fluid chambers. Anolyte flows in one chamber, and catholyte flows in the other chamber. A pH gradient across the membrane allows protons to cross from the catholyte to the anolyte when both fluids are flowing.

In order to control the pH within a specified range, a controller is placed in the fluid path of the anolyte. Any suitable controller can be used, including, but not limited to, a control valve, such as a solenoid valve. The solenoid can open or close based on computer instruction. A simple program can be used to open the valve and allow anolyte to flow through the device when the pH of the anolyte is too high.

The catholyte typically flows through the device at all times, although this is not required. This has an added benefit of acidifying the anolyte which is stagnant in the chamber. This further decreases the size requirement of the PEM by acting to build up a proton concentration to be deployed when needed.

The system can include a sensor in electronic communication with the controller. One or more properties could be used to control the flow of anolyte, including but not limited to, pH, gas pressure, flow rate, turbidity, viscosity, resistance, voltage, current, or combinations thereof. An appropriate sensor would be selected based on the property to be used in controlling the anolyte flow, as is known in the art (e.g., sensors for measuring properties including, but not limit to, pH, gas pressure, flow rate, turbidity, viscosity, resistance, voltage, current, or combinations thereof). Each property (or a combination of properties) would have a predetermined operating range to which the controller would respond by opening or closing the valve to allow or prevent anolyte flow to the negative chamber. For example, the sensor could be a pH meter to measure the pH of the anolyte. The measured pH can be sent to the controller, which will allow or prevent flow of anolyte based on the measured pH and predetermined upper and lower pH limits.

One aspect of the invention is a device for managing the state of health of an electrolyte in a redox flow battery system. In one embodiments, the device comprises: at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop; diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range.

In some embodiments, the device further comprises: a hydrogen recombination unit in the secondary positive electrolyte loop for generating hydrogen ions to control a state of charge of the positive electrolyte and the negative electrolyte; the flow of the negative electrolyte being controlled independently of the state of charge.

In some embodiments, the diffusion cell is downstream of the hydrogen recombination unit.

In some embodiments, the positive electrolyte continuously flows to the positive chamber.

In some embodiments, the controller is a control valve.

In some embodiments, the device further comprises a sensor in electronic communication with the controller, the sensor in the primary negative electrolyte loop.

In some embodiments, the measured property comprises pH, gas pressure, flow rate, turbidity, viscosity, resistance, voltage, current, or combinations thereof.

In some embodiments, the measured property is pH, wherein the controller is a control valve, and further comprising a sensor in electronic communication with the controller, wherein the sensor is a pH meter, and wherein the sensor in the primary negative electrolyte loop.

Another aspect of the invention is a method of managing the state of health of an electrolyte in a redox flow battery system. In one embodiment, the method comprises: providing a redox flow battery system comprising: at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop; a diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range; pumping positive electrolyte through the primary positive electrolyte loop and negative electrolyte through the primary negative electrolyte loop; measuring a property with a sensor; allowing the negative electrolyte to flow through to the negative chamber when the measured property is outside the predetermined operating range and preventing flow to the negative chamber when the measured property is within predetermined operating range.

In some embodiments, the method further comprises: generating hydrogen ions in a hydrogen recombination unit in the secondary positive electrolyte loop to control a state of charge of the positive electrolyte and the negative electrolyte; and controlling the measured property independently of the state of charge.

In some embodiments, the diffusion cell is downstream of the hydrogen recombination unit.

In some embodiments, the positive electrolyte continuously flows to the positive chamber.

In some embodiments, the controller is a control valve and wherein the control valve is opened when the measured property is outside the predetermined range and wherein the control valve is closed when the measured property is within the predetermined range.

In some embodiments, measuring the property comprises measuring pH, gas pressure, flow rate, turbidity, viscosity, resistance, voltage, current, or combinations thereof.

In some embodiments, measuring the property comprises measuring pH, wherein the controller is a control valve, and further comprising a sensor in electronic communication with the controller, wherein the sensor is a pH meter, and wherein the sensor in the primary negative electrolyte loop.

Another aspect of the invention is a device for managing the state of health of an electrolyte in a redox flow battery system. In one embodiment, the device comprises: at least one rechargeable cell comprising a positive electrode, a negative electrode, and a separator positioned between the positive electrode and the negative electrode, a positive electrolyte tank comprising a positive electrolyte in fluid communication with the positive electrode, the positive electrolyte flowing from the positive fluid tank to the positive electrode and from the positive electrode to the positive electrolyte tank in a primary positive fluid loop, and a negative electrolyte tank comprising a negative electrolyte in fluid communication with the negative electrode, the negative electrolyte flowing from the negative fluid tank to the negative electrode and from the negative electrode to the negative electrolyte tank in a primary negative fluid loop; a diffusion cell comprising a positive chamber and a negative chamber separated by a proton conducting membrane, the positive chamber in downstream fluid communication with the primary positive loop in a secondary positive fluid loop, the negative chamber in selective downstream fluid communication with the primary negative loop in a secondary negative fluid loop, the positive electrolyte in the secondary positive loop flowing from the primary positive fluid loop to the positive chamber and to the positive electrolyte tank, and the negative electrolyte in the secondary negative loop flowing from the primary negative fluid loop to the negative chamber and to the negative electrolyte tank; a controller on the secondary negative fluid loop between the negative fluid tank and the negative chamber, the controller selectively allowing the negative electrolyte to flow to the negative chamber when a measured property is outside a predetermined range and preventing the negative electrolyte from flowing to the negative chamber when the measure property is within the predetermined range; a sensor in electronic communication with the controller, the sensor in the primary negative electrolyte loop; a hydrogen recombination unit in the secondary positive fluid loop for generating hydrogen ions to control a state of charge of the positive electrolyte and the negative electrolyte; the measured property being controlled independently of the state of charge.

In some embodiments, the diffusion cell is downstream of the hydrogen recombination unit.

In some embodiments, the positive electrolyte continuously flows to the positive chamber.

In some embodiments, the controller is a control valve.

In some embodiments, the measured property is pH, gas pressure, flow rate, turbidity, viscosity, resistance, voltage, current, or combinations thereof.

FIG. 1 illustrates one embodiment of device incorporating the diffusion cell of the present invention. The device 100 includes an RFB 105, an H2R 110, and a diffusion cell 115.

The RFB 105 include a catholyte tank 120 and a positive electrode 125. It also includes an anolyte tank 130 and a negative electrode 135. The positive electrode 125 and negative electrode 135 are separated by a separator 140. The catholyte flows from the catholyte tank 120 to the positive electrode 125 and back in a primary positive electrolyte loop 145. The anolyte flows from the anolyte tank 130 to the negative electrode 135 and back in a primary negative electrolyte loop 150.

The diffusion cell 115 comprises a positive chamber 155 and a negative chamber 160 separated by a proton conducting membrane 165.

There is a secondary negative electrolyte loop 170 running from the anolyte tank 130 through the negative chamber 160 of the diffusion cell 115 and back to the anolyte tank 130. There is a secondary positive electrolyte loop 175 running from the catholyte tank 120 through the positive chamber 155 of the diffusion cell 115 and back to the anolyte tank 130.

There is a controller 180 on the secondary negative electrolyte loop 170 between the anolyte tank 130 and the negative chamber 160 of the diffusion cell 115. The controller 180 selectively opens and closes to allow or prevent anolyte to flow through the secondary negative electrolyte loop 170. When the pH of the anolyte exceeds a predetermined upper limit (i.e., outside the range), the controller 180 opens and allows the anolyte to flow through the negative chamber 160 of the diffusion cell 115. When the pH of the anolyte is less than a predetermined lower limit (i.e., outside the range), the controller 180 closes and stops the flow of anolyte in the secondary negative electrolyte loop 170.

There can optionally be an H2R unit 110 on the secondary positive electrolyte loop 175. The diffusion cell 115 is desirably located downstream of the H2R unit 110. The H2R unit 110 shown in FIG. 1 is electrochemical and consists of a negative chamber containing a negative electrode, a positive chamber containing a positive electrode, and a separator membrane between the two chambers. The positive chamber is fed with catholyte and is where the reduction of ferric ions to ferrous ions takes place. The negative chamber is fed with hydrogen from the headspace of the electrolyte tanks or from an external source and is where the oxidation of hydrogen to protons occurs. Charges are balanced by electrons flowing through an external electrical circuit from the negative electrode to the positive electrode and protons moving through the separator membrane from the negative chamber to the positive chamber.

SPECIFIC EMBODIMENTS

While the following is described in conjunction with specific embodiments, it will be understood that this description is intended to illustrate and not limit the scope of the preceding description and the appended claims.

A first embodiment of the invention is a device for managing the state of health of an electrolyte in a redox flow battery system comprising at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop; a diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range. An embodiment of the invention is one, any or all of prior embodiments in this paragraph up through the first embodiment in this paragraph further comprising a hydrogen recombination unit in the secondary positive electrolyte loop for generating hydrogen ions to control a state of charge of the positive electrolyte and the negative electrolyte; the flow of the negative electrolyte being controlled independently of the state of charge. An embodiment of the invention is one, any or all of prior embodiments in this paragraph up through the first embodiment in this paragraph wherein the diffusion cell is downstream of the hydrogen recombination unit. An embodiment of the invention is one, any or all of prior embodiments in this paragraph up through the first embodiment in this paragraph wherein the positive electrolyte continuously flows to the positive chamber. An embodiment of the invention is one, any or all of prior embodiments in this paragraph up through the first embodiment in this paragraph wherein the controller is a control valve. An embodiment of the invention is one, any or all of prior embodiments in this paragraph up through the first embodiment in this paragraph further comprising a sensor in electronic communication with the controller, the sensor in the primary negative electrolyte loop. An embodiment of the invention is one, any or all of prior embodiments in this paragraph up through the first embodiment in this paragraph wherein the measured property comprises pH, gas pressure, flow rate, turbidity, viscosity, resistance, voltage, current, or combinations thereof. An embodiment of the invention is one, any or all of prior embodiments in this paragraph up through the first embodiment in this paragraph wherein the measured property is pH, wherein the controller is a control valve, and further comprising a sensor in electronic communication with the controller, wherein the sensor is a pH meter, and wherein the sensor in the primary negative electrolyte loop.

A second embodiment of the invention is a method of managing the state of health of an electrolyte in a redox flow battery system comprising providing a redox flow battery system comprising at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop; a diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range; pumping positive electrolyte through the primary positive electrolyte loop and negative electrolyte through the primary negative electrolyte loop; measuring a property with a sensor; allowing the negative electrolyte to flow through to the negative chamber when the measured property is outside the predetermined operating range and preventing flow to the negative chamber when the measured property is within predetermined operating range. An embodiment of the invention is one, any or all of prior embodiments in this paragraph up through the second embodiment in this paragraph further comprising generating hydrogen ions in a hydrogen recombination unit in the secondary positive electrolyte loop to control a state of charge of the positive electrolyte and the negative electrolyte; controlling the measured property independently of the state of charge. An embodiment of the invention is one, any or all of prior embodiments in this paragraph up through the second embodiment in this paragraph wherein the diffusion cell is downstream of the hydrogen recombination unit. An embodiment of the invention is one, any or all of prior embodiments in this paragraph up through the second embodiment in this paragraph wherein the positive electrolyte continuously flows to the positive chamber. An embodiment of the invention is one, any or all of prior embodiments in this paragraph up through the second embodiment in this paragraph wherein the controller is a control valve and wherein the control valve is opened when the measured property is outside the predetermined range and wherein the control valve is closed when the measured property is within the predetermined range. An embodiment of the invention is one, any or all of prior embodiments in this paragraph up through the second embodiment in this paragraph wherein measuring the property comprises measuring pH, gas pressure, flow rate, turbidity, viscosity, resistance, voltage, current, or combinations thereof. An embodiment of the invention is one, any or all of prior embodiments in this paragraph up through the second embodiment in this paragraph wherein measuring the property comprises measuring pH, wherein the controller is a control valve, and further comprising a sensor in electronic communication with the controller, wherein the sensor is a pH meter, and wherein the sensor in the primary negative electrolyte loop.

A third embodiment of the invention is a device for managing the state of health of an electrolyte in a redox flow battery system comprising at least one rechargeable cell comprising a positive electrode, a negative electrode, and a separator positioned between the positive electrode and the negative electrode, a positive electrolyte tank comprising a positive electrolyte in fluid communication with the positive electrode, the positive electrolyte flowing from the positive fluid tank to the positive electrode and from the positive electrode to the positive electrolyte tank in a primary positive fluid loop, and a negative electrolyte tank comprising a negative electrolyte in fluid communication with the negative electrode, the negative electrolyte flowing from the negative fluid tank to the negative electrode and from the negative electrode to the negative electrolyte tank in a primary negative fluid loop; a diffusion cell comprising a positive chamber and a negative chamber separated by a proton conducting membrane, the positive chamber in downstream fluid communication with the primary positive loop in a secondary positive fluid loop, the negative chamber in selective downstream fluid communication with the primary negative loop in a secondary negative fluid loop, the positive electrolyte in the secondary positive loop flowing from the primary positive fluid loop to the positive chamber and to the positive electrolyte tank, and the negative electrolyte in the secondary negative loop flowing from the primary negative fluid loop to the negative chamber and to the negative electrolyte tank; a controller on the secondary negative fluid loop between the negative fluid tank and the negative chamber, the controller selectively allowing the negative electrolyte to flow to the negative chamber when a measured property is outside a predetermined range and preventing the negative electrolyte from flowing to the negative chamber when the measure property is within the predetermined range; a sensor in electronic communication with the controller, the sensor in the primary negative electrolyte loop; a hydrogen recombination unit in the secondary positive fluid loop for generating hydrogen ions to control a state of charge of the positive electrolyte and the negative electrolyte; the measured property being controlled independently of the state of charge. An embodiment of the invention is one, any or all of prior embodiments in this paragraph up through the third embodiment in this paragraph wherein the diffusion cell is downstream of the hydrogen recombination unit. An embodiment of the invention is one, any or all of prior embodiments in this paragraph up through the third embodiment in this paragraph wherein the positive electrolyte continuously flows to the positive chamber. An embodiment of the invention is one, any or all of prior embodiments in this paragraph up through the third embodiment in this paragraph wherein the controller is a control valve. An embodiment of the invention is one, any or all of prior embodiments in this paragraph up through the third embodiment in this paragraph wherein the measured property is pH, gas pressure, flow rate, turbidity, viscosity, resistance, voltage, current, or combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A device for managing a state of health of an electrolyte in a redox flow battery system comprising:
   at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop;
   a diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; and
   a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range.

2. The device of claim 1 further comprising:
   a hydrogen recombination unit in the secondary positive electrolyte loop for generating hydrogen ions to control a state of charge of the positive electrolyte and the negative electrolyte;
   wherein flow of the negative electrolyte is controlled independently of the state of charge.

3. The device of claim 2 wherein the diffusion cell is downstream of the hydrogen recombination unit.

4. The device of claim 1 wherein the positive electrolyte continuously flows to the positive chamber.

5. The device of claim 1 wherein the controller is a control valve.

6. The device of claim 1 further comprising a sensor in electronic communication with the controller, wherein the sensor is in the primary negative electrolyte loop.

7. The device of claim 1 wherein the measured property comprises pH, gas pressure, flow rate, turbidity, viscosity, resistance, voltage, current, or combinations thereof.

8. The device of claim 1 wherein the measured property is pH, wherein the controller is a control valve, and further comprising a sensor in electronic communication with the controller, wherein the sensor is a pH meter, and wherein the sensor is in the primary negative electrolyte loop.

9. A method of managing a state of health of an electrolyte in a redox flow battery system comprising:
   providing a redox flow battery system comprising:
      at least one rechargeable cell comprising a positive electrode, a negative electrode, and a separator positioned between the positive electrode and the negative electrode, a positive electrolyte tank comprising a positive electrolyte in fluid communication with the positive electrode in a primary positive electrolyte loop, and a negative electrolyte tank comprising a negative electrolyte in fluid communication with the negative electrode in a primary negative electrolyte loop;

a diffusion cell comprising a positive chamber and a negative chamber separated by a proton conducting membrane, the positive chamber in fluid communication with the primary positive electrolyte loop and the positive electrolyte tank in a secondary positive electrolyte loop, the negative chamber in selective fluid communication with the primary negative electrolyte loop and the negative electrolyte tank in a secondary negative electrolyte loop; and a controller on the secondary negative electrolyte loop between the negative electrolyte tank and the negative chamber, the controller selectively allowing the negative electrolyte to flow to the negative chamber when a measured property is outside a predetermined operating range and preventing the negative electrolyte from flowing to the negative chamber when the measured property is within the predetermined operating range;

pumping positive electrolyte through the primary positive electrolyte loop and negative electrolyte through the primary negative electrolyte loop;

measuring a property with a sensor; and allowing the negative electrolyte to flow through to the negative chamber when the measured property is outside the predetermined operating range and preventing flow to the negative chamber when the measured property is within predetermined operating range.

10. The method of claim 9 further comprising:

generating hydrogen ions in a hydrogen recombination unit in the secondary positive electrolyte loop to control a state of charge of the positive electrolyte and the negative electrolyte; and controlling the measured property independently of the state of charge.

11. The method of claim 10 wherein the diffusion cell is downstream of the hydrogen recombination unit.

12. The method of claim 9 wherein the positive electrolyte continuously flows to the positive chamber.

13. The method of claim 9 wherein the controller is a control valve and wherein the control valve is opened when the measured property is outside the predetermined operating range and wherein the control valve is closed when the measured property is within the predetermined operating range.

14. The method of claim 9 wherein measuring the property comprises measuring pH, gas pressure, flow rate, turbidity, viscosity, resistance, voltage, current, or combinations thereof.

15. The method of claim 9 wherein measuring the property comprises measuring pH, wherein the controller is a control valve, and further comprising a sensor in electronic communication with the controller, wherein the sensor is a pH meter, and wherein the sensor is in the primary negative electrolyte loop.

16. A device for managing a state of health of an electrolyte in a redox flow battery system comprising:

at least one rechargeable cell comprising a positive electrode, a negative electrode, and a separator positioned between the positive electrode and the negative electrode, a positive electrolyte tank comprising a positive electrolyte in fluid communication with the positive electrode, the positive electrolyte flowing from the positive electrolyte tank to the positive electrode and from the positive electrode to the positive electrolyte tank in a primary positive fluid loop, and a negative electrolyte tank comprising a negative electrolyte in fluid communication with the negative electrode, the negative electrolyte flowing from the negative electrolyte tank to the negative electrode and from the negative electrode to the negative electrolyte tank in a primary negative fluid loop;

a diffusion cell comprising a positive chamber and a negative chamber separated by a proton conducting membrane, the positive chamber in downstream fluid communication with the primary positive fluid loop in a secondary positive fluid loop, the negative chamber in selective downstream fluid communication with the primary negative fluid loop in a secondary negative fluid loop, the positive electrolyte in the secondary positive fluid loop flowing from the primary positive fluid loop to the positive chamber and to the positive electrolyte tank, and the negative electrolyte in the secondary negative fluid loop flowing from the primary negative fluid loop to the negative chamber and to the negative electrolyte tank;

a controller on the secondary negative fluid loop between the negative electrolyte tank and the negative chamber, the controller selectively allowing the negative electrolyte to flow to the negative chamber when a measured property is outside a predetermined range and preventing the negative electrolyte from flowing to the negative chamber when the measured property is within the predetermined range;

a sensor in electronic communication with the controller, the sensor is in the primary negative fluid loop; and a hydrogen recombination unit in the secondary positive fluid loop for generating hydrogen ions to control a state of charge of the positive electrolyte and the negative electrolyte;

the measured property being controlled independently of the state of charge.

17. The device of claim 16 wherein the diffusion cell is downstream of the hydrogen recombination unit.

18. The device of claim 16 wherein the positive electrolyte continuously flows to the positive chamber.

19. The device of claim 16 wherein the controller is a control valve.

20. The device of claim 16 wherein the measured property is pH, gas pressure, flow rate, turbidity, viscosity, resistance, voltage, current, or combinations thereof.

* * * * *